United States Patent
Thomas

(10) Patent No.: US 8,413,684 B2
(45) Date of Patent: Apr. 9, 2013

(54) BALL VALVE WITH ANTI-ROTATIONAL PRESSURE PLATE

(75) Inventor: Kurt R. Thomas, Durand, IL (US)

(73) Assignee: Schneider Electric Buildings, LLC, Loves Park, IL (US)

( * ) Notice: Subject to any disclaimer, the term of this patent is extended or adjusted under 35 U.S.C. 154(b) by 803 days.

(21) Appl. No.: 12/561,098

(22) Filed: Sep. 16, 2009

(65) Prior Publication Data

US 2011/0062366 A1  Mar. 17, 2011

(51) Int. Cl.
  *F16K 5/06* (2006.01)
(52) U.S. Cl. ............... 137/625.41; 137/602; 138/46; 251/118; 251/174; 251/209; 251/315.01
(58) Field of Classification Search ............ 251/118, 251/127, 304, 315.01–315.16, 174, 209; 138/40–46; 137/625.4, 625.41, 602
  See application file for complete search history.

(56) References Cited

U.S. PATENT DOCUMENTS

| | | | | |
|---|---|---|---|---|
| 2,419,481 A | * | 4/1947 | Carbon | 137/625.11 |
| 2,591,102 A | * | 4/1952 | Snyder | 137/625.16 |
| 2,661,926 A | * | 12/1953 | Resek | 137/625.47 |
| 2,698,731 A | * | 1/1955 | Koehler et al. | 251/172 |
| 3,118,650 A | * | 1/1964 | Cooper et al. | 251/172 |
| 3,156,260 A | * | 11/1964 | Harvey et al. | 137/625.41 |
| 3,228,652 A | * | 1/1966 | Antrim | 251/175 |
| 3,667,727 A | | 6/1972 | Bowden | |
| 3,795,384 A | | 3/1974 | Reddy | |
| 3,960,363 A | | 6/1976 | Domyan | |
| 3,985,334 A | | 10/1976 | Domyan | |
| 4,020,864 A | * | 5/1977 | Church, Jr. | 137/242 |
| 4,061,307 A | | 12/1977 | Yoshiike et al. | |
| 4,071,220 A | | 1/1978 | Iino | |
| 4,085,774 A | * | 4/1978 | Baumann | 137/625.3 |
| 4,111,393 A | | 9/1978 | McClurg et al. | |
| 4,173,234 A | | 11/1979 | Thomas et al. | |
| 4,289,165 A | | 9/1981 | Fredd | |
| 4,318,420 A | | 3/1982 | Calvert | |
| 4,388,945 A | | 6/1983 | Johnson et al. | |
| 4,390,039 A | | 6/1983 | Johnson et al. | |
| 4,410,165 A | | 10/1983 | Koch et al. | |
| 4,441,524 A | * | 4/1984 | Mese | 137/625.47 |
| 4,477,055 A | | 10/1984 | Partridge | |
| 4,479,513 A | * | 10/1984 | Koch et al. | 137/625.47 |
| 4,566,672 A | | 1/1986 | Giebeler | |
| 4,602,762 A | | 7/1986 | Koch et al. | |
| 4,641,682 A | * | 2/1987 | Harris | 137/329.04 |

(Continued)

FOREIGN PATENT DOCUMENTS

| | | |
|---|---|---|
| CN | 1151202 A | 6/1997 |
| CN | 201043616 Y | 4/2008 |

(Continued)

*Primary Examiner* — John Bastianelli

(74) *Attorney, Agent, or Firm* — Reinhart Boerner Van Deuren P.C.

(57) ABSTRACT

A ball valve having an anti-rotational pressure plate that allows for a balanced pressure load on a valve member is provided. Additionally, the pressure plate can also fix the rotation of an adjacent flow disk, allowing for angular-orientation specific flow characterizing features to be used with the flow disk. By fixing the rotation of the flow disk, the ball valve can characterize flows using a greater variety of flow disk geometries, including angular-orientation dependent and angular-orientation independent flow disks. Further, the pressure plate could also be directly in the form of a flow disk that has anti-rotation features.

14 Claims, 5 Drawing Sheets

U.S. PATENT DOCUMENTS

| | | | |
|---|---|---|---|
| 4,651,775 A * | 3/1987 | Okada | 137/625.41 |
| 4,718,444 A | 1/1988 | Boelte | |
| 4,815,701 A | 3/1989 | Stone | |
| 4,911,408 A | 3/1990 | Kemp | |
| 5,074,522 A | 12/1991 | Reynolds et al. | |
| 5,118,078 A | 6/1992 | Younker | |
| 5,181,690 A | 1/1993 | Gonsior | |
| 5,261,454 A * | 11/1993 | Pavlica et al. | 137/625.48 |
| 5,399,119 A | 3/1995 | Birk et al. | |
| 5,482,249 A | 1/1996 | Schafbuch et al. | |
| 5,494,256 A | 2/1996 | Beson | |
| 6,039,304 A | 3/2000 | Carlson et al. | |
| 6,109,591 A | 8/2000 | Tuttle et al. | |
| 6,401,754 B1 | 6/2002 | Winquist et al. | |
| 6,402,610 B1 | 6/2002 | Gloisten | |
| 6,533,241 B1 | 3/2003 | Chen | |
| 6,681,793 B2 | 1/2004 | Mike | |
| 6,910,673 B2 * | 6/2005 | Green et al. | 251/118 |
| 6,948,699 B1 | 9/2005 | Keiser | |
| 7,108,012 B2 | 9/2006 | Rosko et al. | |
| 7,111,643 B2 | 9/2006 | Oh | |
| 7,243,901 B2 | 7/2007 | Eggleston | |
| 7,296,585 B2 | 11/2007 | Eggleston et al. | |
| 7,559,531 B2 | 7/2009 | Thomas | |
| 2001/0030309 A1 * | 10/2001 | Carlson et al. | 251/209 |
| 2006/0131533 A1 * | 6/2006 | Oh | 251/315.01 |
| 2006/0162792 A1 | 7/2006 | Oh | |
| 2008/0029726 A1 | 2/2008 | Pozzati | |
| 2008/0315144 A1 | 12/2008 | Thomas | |
| 2009/0242817 A1 * | 10/2009 | Strazhgorodskiy | 251/315.16 |

FOREIGN PATENT DOCUMENTS

| | | |
|---|---|---|
| CN | 101328981 A | 12/2008 |
| DE | 20108667 U1 | 11/2001 |
| EP | 0 763 680 A1 | 3/1997 |
| WO | WO 99/61823 A1 | 12/1999 |
| WO | WO 01/38761 A1 | 5/2001 |
| WO | WO 2009/076228 A2 | 6/2009 |

* cited by examiner

BALL VALVE WITH ANTI-ROTATIONAL PRESSURE PLATE

FIELD OF THE INVENTION

This invention generally relates to ball valves and more particularly relates to an ball valves including flow-characterization devices in cooperation with the valve member to adjust flow characteristics of the valve.

BACKGROUND OF THE INVENTION

Ball valves typically include a valve body that includes a plurality of ports. A valve member carried within the valve body selectively directs fluid between selected ones of the ports based upon the selected orientation of the valve member relative to the valve body. The valve member directs fluid through the ball valve via a passage in the valve member that can be selectively aligned with certain ones of the plurality of ports, thereby creating a fluid flow passage. The valve is said to be in the "open" position when the passage of the valve member is selectively aligned with one port and any number of the remaining ports. The valve is said to be in the "closed" position when the passage of the valve member is out of alignment with all of the ports.

Ball valves also typically require the use of seals at each of the ports of the valve member within the valve body. The seals function to prevent fluid flow around the valve member, thereby restricting all fluid flow to the passage of the valve member. However, valve seals can leak and allow undesired fluid flow when the valve is in the closed position due to machining tolerances of the valve body, valve seals, and valve member. Furthermore, ball valves can deform or shift under large pressure differentials, also causing the seals to leak.

To overcome these problems, valve seals are often designed to dynamically adjust to compensate for different pressure loads and machining tolerances via the use of dynamic seals. Dynamic seals often incorporate a pressure plate that is biased against the valve seal under the action of a spring. Typically, one end of the spring contacts the pressure plate, while another end of the spring is compressed by tightening a fitting installed in the port that is in line with the seal. Unfortunately, the end of the spring in contact with the pressure plate move off of center of the pressure plate during assembly and/or operation. When the spring is off of center, the pressure plate imparts an unbalanced load on the valve member. When the pressure load upon the valve member is unbalanced, the valve member will impart an undesirable torque upon a valve stem of the ball valve. This can lead to leakage at the valve stem, or stress fractures within the stem.

Moreover, in multi-port applications, one port typically allows flow along an axis that is transverse to two inline ports, such as in a three way valve. If the valve member is biased out of centered alignment with the inline ports, a leak path may be generated between the valve member and one or more of the dynamic seals.

Additionally, in certain types of ball valves, the valve body may also house a flow disk. The flow disk operates to characterize the flow through the ball valve as the ball valve transitions between open and closed conditions. The flow disk characterizes the flow through the ball valve by introducing any number of geometrical obstructions generally normal to the direction of fluid flow through any open fluid flow passage of the ball valve. As the ball valve is rotated between the open and closed states, the inclusion of a flow disk causes the flow passage through the valve member to align with a different shaped aperture through the flow disk than was present without the flow disk at the same angular orientation. Thus, the flow disks recharacterize the flow of the fluid at a given angular orientation of the ball valve. Typically, the pressure plate and flow disk are concentric with one another, and adjacently aligned at a port within the valve body.

Unfortunately, current fluid flow disks may freely rotate within the valve body about their central axis. Therefore, in order for the flow disk to provide a repeatable characterization of the flow through the valve, the flow disk must be designed to offer the same characterization regardless of its angular rotation. This design constraint limits the types of flow governance a flow disk can offer. Alternatively, painstaking measures must be taken during assembly to assure the proper orientation of the flow disk. Further yet, a large force must be applied to the flow disk to create sufficient friction to prevent angular rotation thereof.

Embodiments of the present invention relate to improvement over the current state of the art.

BRIEF SUMMARY OF THE INVENTION

In one embodiment, the invention provides a ball valve with an anti-rotational flow disk that provides uniform and dynamic sealing while also characterizing the flow through the valve. Such a ball valve includes a valve body having a plurality of ports and a valve chamber therebetween, the plurality of ports and the valve member defining a fluid flow passage. A valve member is disposed within the valve chamber, and is selectively movable within the valve chamber to adjust the flow therethrough. A valve seal is carried by the valve body and sealingly cooperates with the valve member and valve body to prevent or minimize fluid bypass. A flow disk is also carried by the valve body and is substantially disposed within the fluid flow passage. The flow disk is operably constrained within the valve body such that the flow disk is prevented from angular rotation about a center axis of the flow disk. By preventing the flow disk from angular rotation, the flow disk can be maintained at a desired angular orientation relative to the valve body and can incorporate angular-orientation specific flow characterizing features, and is therefore not limited to flow characterizing features that characterize the flow regardless of their angular orientation.

In one embodiment, the flow disk is operably constrained by engagement with the pressure plate. The pressure plate is constrained to prevent rotation relative to the valve body, and consequently the valve member. Thus, by operable engagement between the valve body, the pressure plate and the flow disk, the flow characterization features of the flow disk are fixed in a desired angular orientation such that the proper portion of the flow disk is aligned with the proper portion of the passage through the valve member at a given degree of open/close of the valve member (i.e. orientation of the valve member passage with the corresponding port of the valve body).

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
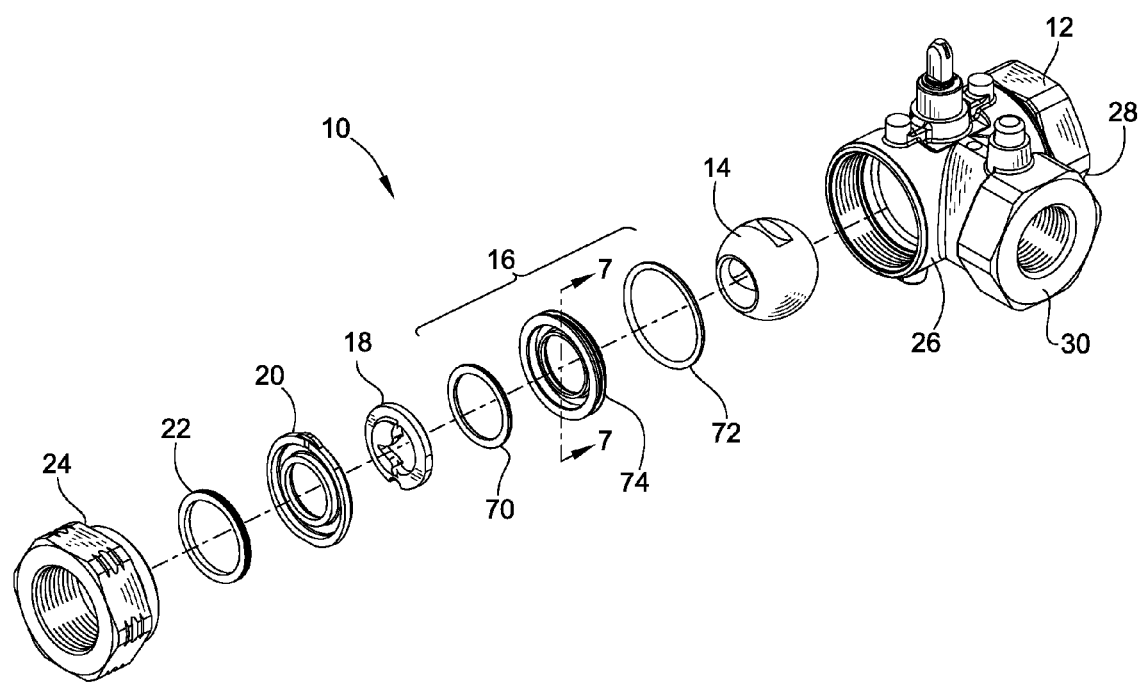
FIG. 1 is an exploded or assembly view of a ball valve according to an embodiment of the present invention.

FIG. 1 illustrates the assembly of an exemplary embodiment of a ball valve 10 according to the teachings of the invention. The ball valve 10 includes a valve body 12 that houses a valve member 14. The valve member 14 is in sealing engagement with a valve seal 16. A flow disk 18 is in sealing engagement with the valve seal 16, and a pressure plate 20 biases the flow disk 18, and accordingly the valve seal 16, toward the valve member 14 under the operation of a biasing element 22. A fitting 24 engages the valve body 12 and compresses the biasing element 22 toward valve member 14 and against pressure plate 20.

Figure 2:
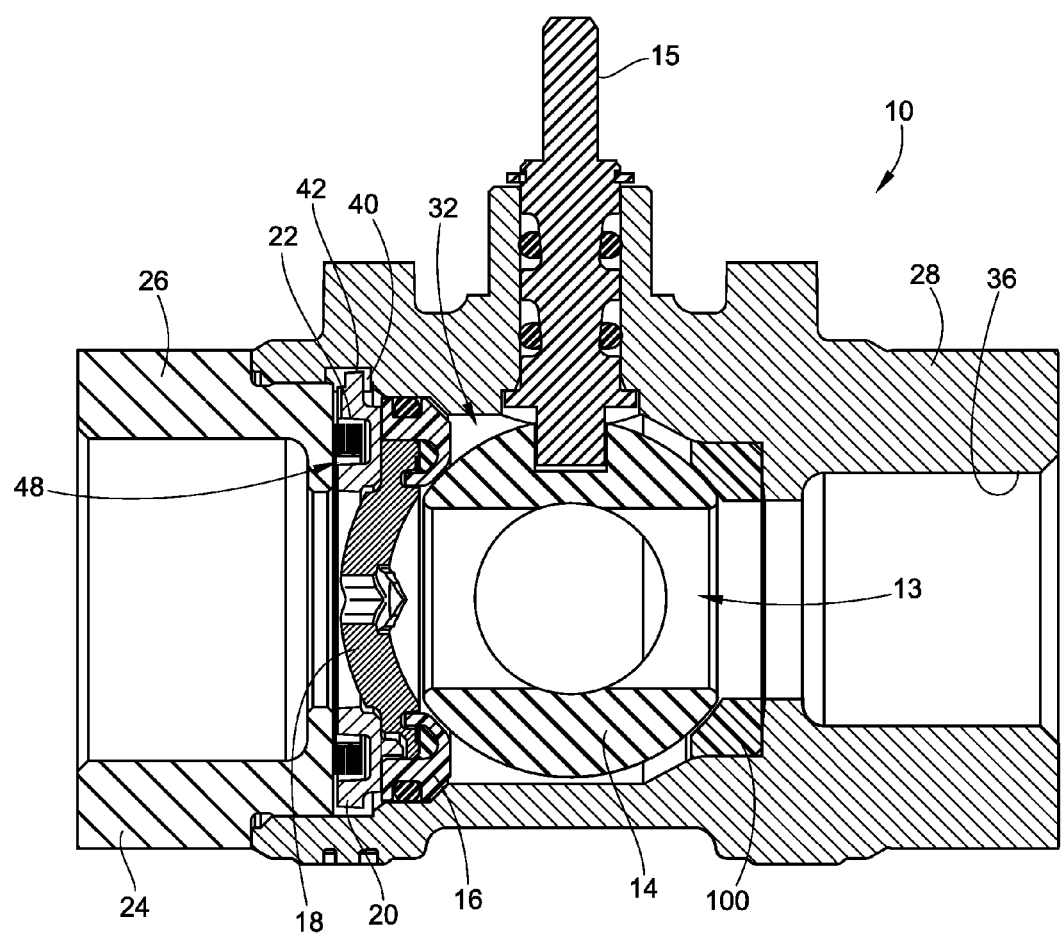
FIG. 2 is a cross-section view of the ball valve of FIG. 1.

With reference to FIGS. 1 and 2, the valve body 12 has a pair of inline ports 26, 28 and a transverse port 30. However, the teachings of the present invention can extend to other types of valves, for non-limiting example two or four port ball valves. Linking the inline ports 26, 28 and the transverse port 30 is a valve chamber 32. The inline ports 26, 28 extend along a common axis outward from the valve chamber 32, and the transverse port 30 extends transversely away from the valve chamber 32. In the illustrated embodiment, the transverse port 30 generally extends away from the valve chamber 32 at a ninety-degree angle, but in other embodiments, can extend away from the valve chamber 32 at other angles. In the illustrated embodiment, one of the inline ports 26 has a larger inner diameter than the other inline port 28 in order to receive the valve member 14, valve seal 16, flow disk 18, and pressure plate 20 during assembly.

The valve member 14 is selectively movable within the valve chamber 32 via the rotation of a valve stem 15. As illustrated in FIG. 2, the valve member 14 has a passage 13 therethrough. The passage 13 of the valve member 14 can be aligned to allow fluid communication between any of the ports 26, 28, 30 by creating a fluid flow passage. Although the valve member 14 is selectively movable by rotation of the valve stem 15, in other embodiments other types of actuation can be utilized, such as but not limited to servo drives, motors, etc.

Figure 3:
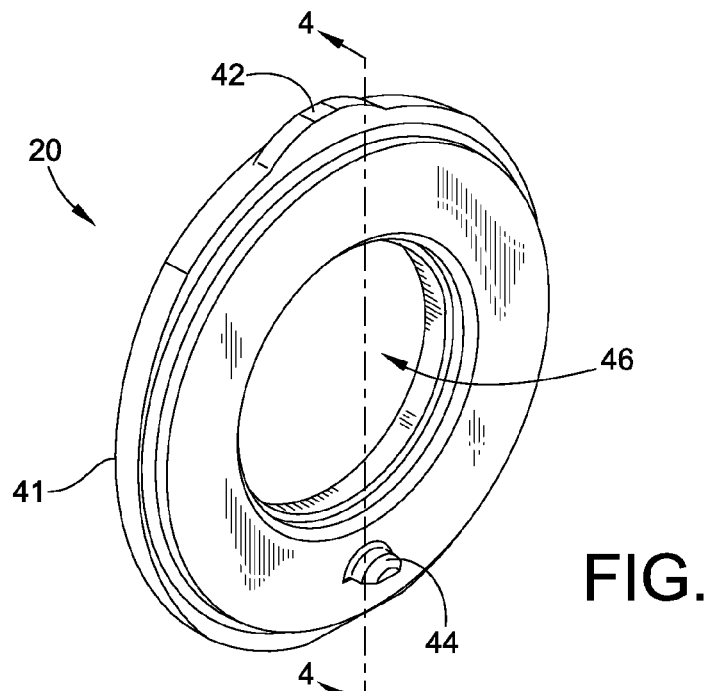
FIG. 3 is a perspective view of a pressure plate of the ball valve of FIG. 1.

FIG. 3 illustrates an embodiment of a pressure plate 20. As illustrated in FIG. 2, the pressure plate 20 is biased by the biasing element 22 against the flow disk 18 that in turn is biased against the valve seal 16. The pressure plate 20 is designed to exert a uniform pressure upon the flow disk 18 and consequently valve seal 16 in order to prevent undesired leakage through the valve member 14 when it is in the closed position. In this embodiment, the pressure plate 20 is prevented from rotating relative to valve body. Rotation is prevented by use of a radially extending key 42 that is received by a slot 40 (see FIG. 2) in the valve body 12. The illustrated radially extending key 42 and slot 40 are thus a first set of anti-rotation structures to prevent the rotation of the pressure plate 20. As will be discussed more fully below, these structures could be reversed.

Figure 4:
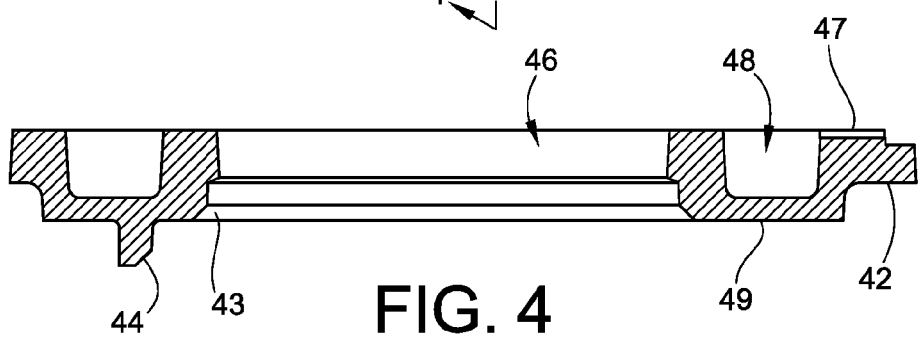
FIG. 4 a cross-section of the pressure plate of FIG. 3.

With reference to FIGS. 3 and 4, the pressure plate extends axially between a port-facing surface 47, and a seal-facing surface 49. Extending into the port-facing surface 47 is an annular pocket 48 for receipt of an end of the biasing element 22. The pressure plate 20 has an opening 46 to allow fluid flow therethrough. In the illustrated embodiment, the opening 46 incorporates a transition feature 43 for smooth receipt of a flow-characterizing feature 50 of the flow disk 18. A first key 42 extends radially outward from an outer periphery 41 of the pressure plate generally in a radial direction. A second key 44 extends transversely away from the seal-facing surface 49 generally in the axial direction.

Referring to FIGS. 1-4, a fitting 24 engages the valve body 12. Various types of fittings 24 can be used at the ports 26, 28, 30, such as compression, NPT, soldered, etc. As the fitting 24 is tightened to the valve body 12, the fitting 24 compresses the biasing element 22, that in turn, biases the pressure plate 20 and flow disk 18 toward the valve member 14 as described above. The pocket 48 of the pressure plate 20 receives an end of the biasing element 22.

The annular pocket 48 is centered on the pressure plate 20 and accomplishes two functions. First, the pocket 48 ensures that the biasing element 22 exerts a uniform pressure upon the pressure plate 20, relative to the center thereof. This uniform pressure minimizes the stem torque that the valve member 14 will place upon the valve stem 15 as well as maintains uniform sealing pressure onto valve seal 16. Second, the pocket 48 assists in rapid assembly of the ball valve 10, because the biasing element 22 can be quickly placed in the pocket 48 as opposed to carefully located against the pressure plate 20 to ensure that the biasing element 22 is centered there against. In the illustrated embodiment, the pocket 48 of the pressure plate has a generally rectangular cross-section. However, in other embodiments, the pocket 48 can have various other geometrical cross sections such as but not limited to circular, square, and triangular cross sections. The biasing element 22 can include any number of resilient mechanical components such as a simple compression spring, coil spring, or a disk spring sized to exert enough pressure against the pressure plate 20 to accomplish the sealing functionality described above.

Referring back to FIG. 2, the radially extending key 42 extends into the slot 40 of the valve body 12. The slot 40 extends a length in the axial direction of the valve body 12 that is greater than the axial thickness of the radially extending key 42. The radially extending key 42 is therefore free to slide within the slot 40 in the axial direction as the pressure plate 20 is biased by the biasing member 22. However, the slot 40 traps either side of the radially extending key 42, thereby preventing the pressure plate 20 from angular rotation relative to the valve body 12 about its central axis. The key 42 and slot 40 interface therefore ensures that the pressure plate 20 cannot rotate within valve body 12 during or after assembly.

Figure 5:
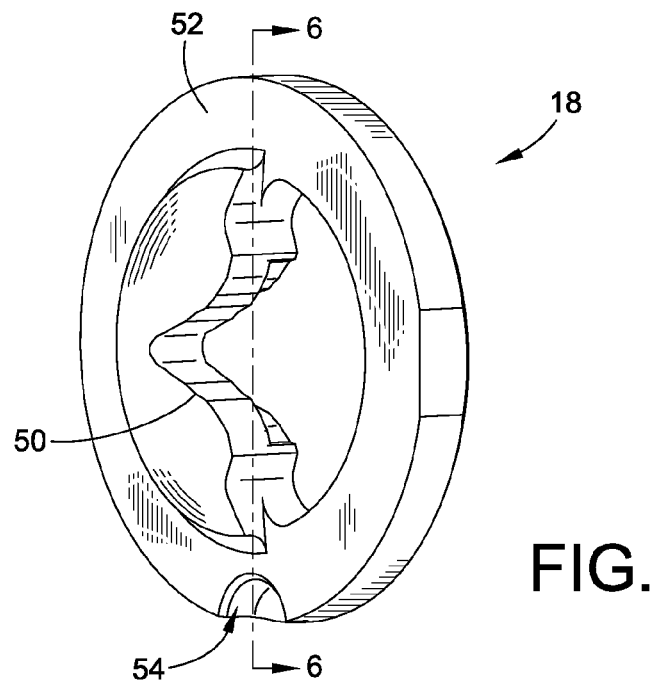
FIG. 5 is a perspective view of a flow disk of the ball valve of FIG. 1.
Figure 6:
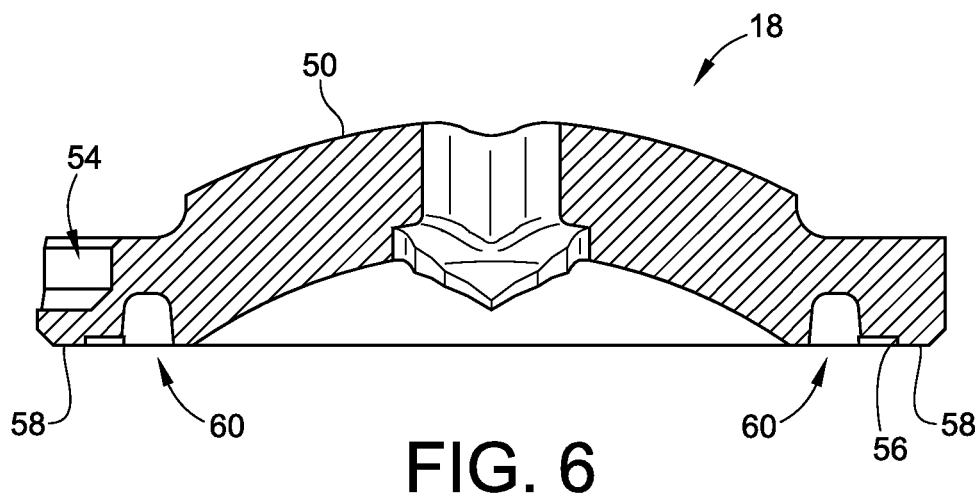
FIG. 6 is a cross-section view of the flow disk of FIG. 5.

Turning now to FIGS. 5 and 6, an embodiment of a flow disk 18 is illustrated. The flow disk 18 extends axially between a port-facing surface 52, and a seal facing surface 56 and has a generally circular periphery. The flow disk has an opening with a flow characterizing feature 50 disposed therein. An annular sealing rib 58 extends transversely away from the seal-facing surface 56, and an annular locating pocket or channel 60 extends into the seal-facing surface 56.

With reference to FIGS. 3-5, the axially extending key 44 of the pressure plate 20 extends into a keyway 54 of the flow disk 18 forming a second set of anti-rotation structures. Again, these structures could be reversed and other anti-rotation structures could be provided. The key 44, when received by the keyway 54 of the flow disk 18, prevents the flow disk 18 from rotation about its central axis relative to the pressure plate. In the illustrated embodiment, the axially extending key 44 and keyway 54 are dimensioned to mate when the seal-facing surface 49 of the pressure plate 20 is in abutted contact with the port-facing surface 52 of the flow disk. However, commensurate with the pressure plate 20, the flow disk 18 is free to slide within the valve body 12 in the axial direction. Accordingly, by virtue of the keys 42, 44 of the pressure plate 20, the pressure plate 20 and flow disk 18 have a degree of axial translation governed by the length of the slot 40 and provided by the action of the biasing element 22, but remain constrained from angular rotation.

Still referring to FIGS. 3-5, as noted above, the flow disk 18 cannot rotate about its central axis when the keyway 54 receives the axially extending key 44 of the pressure plate 20. This allows for the flow characterizing feature 50 to introduce angular-orientation specific obstructions to the fluid flow through the valve (i.e. they do not have to be rotation symmetric about the central axis). This anti-rotational configuration increases the types of flow characterizing features 50 that can be incorporated into the ball valve 10. Indeed, the ball valve 10 can now utilize angular-orientation independent flow characterizing features 50 and angular-orientation specific flow characterizing features 50. Moreover, the flow disk 18 is interchangeable. More particularly, a single ball valve 10 can be supplied with any number of flow disks 18 that can be rapidly interchanged based on user demand. To interchange a flow disk 18, a user simply removes the fitting 24, biasing element 22, pressure plate 20, and flow disk 18 from the valve body 12. A new flow disk 18 can then be aligned with the axially extending key 44 via the keyway 54, and loaded back into the valve body 12. The biasing element 22 and fitting 24 are then also reinstalled and the fitting is then tightened to bias the new flow disk 18 against the valve seal 16.

With regard to the anti-rotation structures, the term "key" is not meant to limit the keys 42, 44 of the pressure plate 20 to any particular geometry. Instead, the keys 42, 44 can be any transversely extending feature. Similarly, the terms "slot" and "keyway" are not meant to limit the slot 40 of the valve body 12 or the keyway 54 of the flow disk 18 to any particular geometry. Instead, the slot 40 and keyway 54 can be any inwardly extending opening. Further, the keys 42, 44 and keyway 54 and slot 40 could be reversed such that the slots/keyways are formed in pressure plate 20 with the keys formed in the valve body 12 and flow disk 18.

Figure 8:
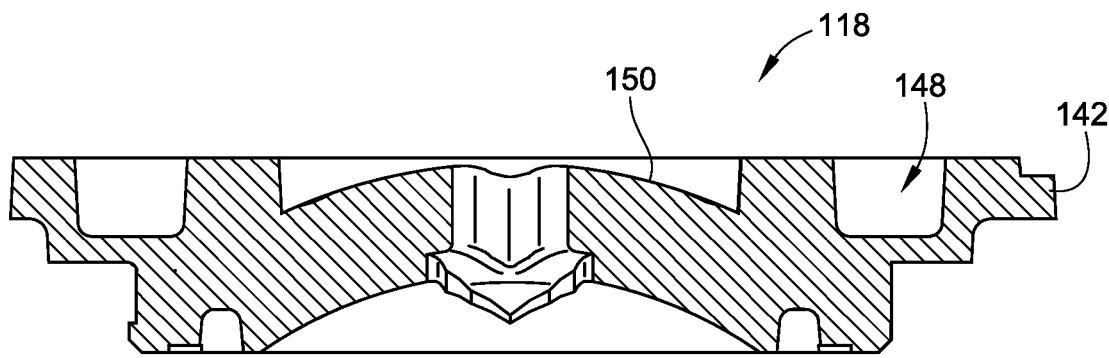
FIG. 8 is a further embodiment of a flow disk/pressure plate combination useable in practicing embodiments of the present invention.

Furthermore, the flow characterizing feature 50 of the flow disk 18 can be directly incorporated into pressure plate 20, thereby allowing the separate flow disk 18 to be omitted from the ball valve 12 entirely. In such an embodiment, as illustrated in FIG. 8, the combined pressure plate and flow disk offers most if not all of the advantages of each in their singular forms. The result is a flow disk 118 that biases the valve seal 16 against the valve member 14 and characterizes the flow through the valve in accordance with the teachings herein. This flow disk 118 includes the same annular pocket 118 and key 142 as prior embodiments of the pressure plate but also includes flow characterization feature 150 of the flow disk 18. The embodiment of FIG. 8 is considered a one-piece construction. As used herein, a "one-piece construction" is not formed from a plurality of parts coupled together. Representative examples of a one-piece construction would include a part of a continuous material such as formed by a single mold process or a part machined from single piece of material. It would not include parts that are bolted, screwed, welded or otherwise connected together to form a single component.

Figure 7:
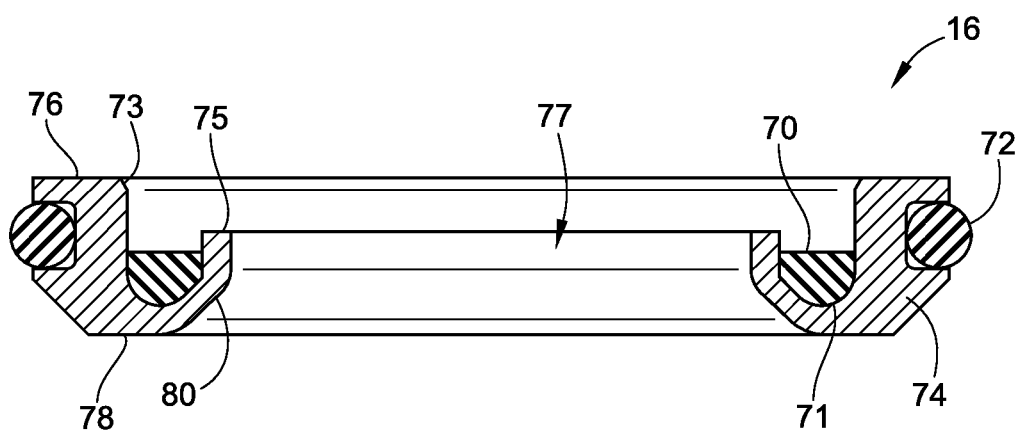
FIG. 7 is a cross-section view of a valve seal of the ball valve of FIG. 1.

Referring now to FIGS. 6 and 7 with particular attention to FIG. 6, an embodiment of the valve seal 16 is illustrated extending between a port-facing surface 76 and seal-facing surface 78 and having an opening 77 to allow fluid flow therethrough. The valve seal 16 includes a seal member 74, a compliant flow disk seal 70, and a compliant valve body seal 72. The seal member 74 houses the flow disk seal 70 and the valve body seal 72 in pockets 71 and 73 respectively. When assembled, the annular sealing ring 58 of the flow disk 18 is in abutted contact with the compliant flow disk seal 70 of the valve seal 16. The compliant flow disk seal 70 prevents fluid bypass into the valve chamber 32 between the flow disk 18 and seal member 74 when the valve member is in the closed position. The locating ring 75 centers the flow disk 18 when the locating ring 75 of the seal member 74 is received by the locating pocket 60 of the flow disk 18. The flow characterizing feature 50 of the flow disk 18 is therefore maintained in the center of fluid flow through the ball valve 10.

Still referring to FIGS. 6 and 7, the compliant valve body seal 72 prevents fluid bypass into the valve chamber 32 between the interior surface 36 of the valve body 12 and seal member 74. The compliant valve body seal 72 can slide in frictional contact with the interior surface 36 in the axial direction within the valve body 12 when the valve seal 16 is biased toward the valve member 14. The valve seal also 16 includes an arcuate sealing surface 80 at an edge of the annular opening 77. The annular sealing surface 80 is biased against the valve member 14 by the biasing element 22 exerting an axial force through the pressure plate 20 and flow disk 18, thereby preventing ingress into the valve chamber 32.

Figure 9:
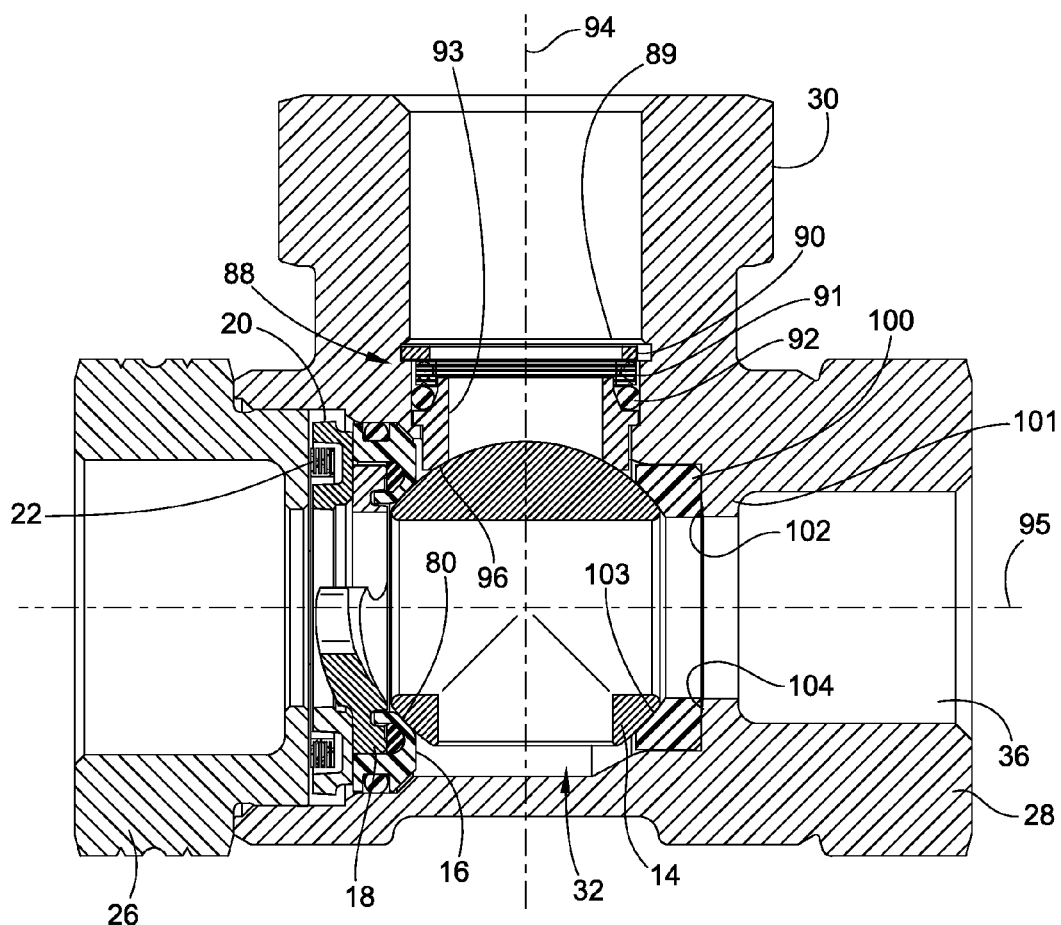
FIG. 9 is a further cross-section view of the ball valve of FIG. 1.

Turning now to FIG. 9, the transverse port 30 of the ball valve is illustrated as including a dynamic seal 88 carried therein. The dynamic seal 88 includes a snap ring 90, a biasing element 91, a compliant seal 92, and a dynamic seal member 93. The snap ring 90 is carried within a groove 89 extending into the interior surface of the valve body 12. One end of the biasing element 91 is in abutted contact with the snap ring 90, while the other end of the biasing element is in abutted contact with the compliant sealing element 92. The compliant sealing element 92 is in sealing engagement with the dynamic seal member 93, and the interior surface 36 of the valve body 12. The dynamic seal member 93 includes an arcuate surface 96 that sealingly engages the valve member 14. As such, the dynamic seal 88 functions by biasing dynamic sealing member 93 against the valve member 14 along center axis 94 of the transverse port 30.

The above action in turn biases the valve member 14 against the arcuate surface 80 of the seal member 74 of the valve seal 16, and an arcuate surface 103 of a fixed valve seal 100 located between the valve member 14 and the inline port 28 opposite the inline port 26 containing the flow disk 18. As is readily understood from the teachings herein, the pressure plate 20, biasing element 22, and valve seal 16 together also function as a dynamic seal. Accordingly, the illustrated embodiment of FIG. 9 presents a ball valve 10 having 2 dynamic seals. The dynamic seals are biased against the valve member 14 along axes' 94, 95 that are generally transverse to one another. While illustrated as perpendicular, axes 94, 95 could extend at other non-zero angles.

Still referring to FIG. 9, the inline port 28 opposite the inline port 26 that contains the flow disk 18 has a radially inward extending annular abutment flange 101 with an abutment surface 102. The annular abutment flange 101 extends inward from the interior surface 36 of the valve body 12. The abutment flange 101 serves as a positive stop for the fixed valve seal 100 and a locating feature for loading the position of the components of the valve during assembly. More particularly, as the biasing element 22 biases the valve seal 16 towards the valve member 14, the fixed valve seal 100 in concert with the abutment flange 101 provide a primary locating feature preventing the valve member 14 from coming out of center alignment with the center axis 94 of the transverse port 30 along axis 95.

Due to the cupped shape of arcuate surface 103, the static valve seal 100 provides positive locating of the valve member 14 along axis 94. Thus, valve member 14 does not come out of center alignment with the center axis 95 of the inline ports 26, 28 when the biasing element 91 of the transverse port biases the dynamic seal member 93 against the valve member 14 along the center axis 94 of the transverse port or due to pressure variations. More particularly, as the biasing element 91 of the dynamic seal 88 at the transverse port 30 biases the dynamic seal member 93 against the valve member 14, the valve member 14 is in abutted contact with the arcuate surfaces 80, 103 of the seal member 74 and fixed seal 100, respectively. In effect, the fixed seal 100 ensures that the valve member maintains a true center within the valve chamber 32 with respect to the center axes 94, 95 of the inline ports 26, 28 and the transverse port 30 respectively.

To accomplish the above alignment and sealing functions, the seal member 74, fixed seal 100, and dynamic seal member 93 are formed from a compliant low friction plastic. However, in other embodiments, other materials for the above components can also be utilized to provide the seals. Further, to promote good tolerances, there is only one component directly located between the valve member 14 and valve body 12 to provide the positioning of valve member 14. This prevents tolerance stack up.

The valve member 14 generally rotates about an axis orthogonal to the intersection of axes 94, 95.

As described herein, the embodiments of the ball valve with anti-rotational pressure plate provide an advance in the art of ball valves. More particularly, the ball valve with anti-rotational pressure plate provides a ball valve 10 with a flow disk 18 and pressure plate 20 that are fixed in an angular orientation within the valve body 12 of the ball valve 10, allowing for a balanced pressure load upon the valve member 14 of the ball valve 12 and also allowing for angular-orientation dependent flow disks without the anti-rotation features, the flow disk 18 could rotate and it would be difficult to orient the flow disk 18 during assembly. When the valve member transitions between the closed and open orientations, the opening in the valve member 14 may align with the wrong portions of the flow disk 18 at the wrong angular position of the valve member 14.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A ball valve, comprising:
a valve body having a plurality of ports and a valve chamber therebetween, the plurality of ports and the valve chamber defining a fluid flow passage;
a valve member disposed within the valve chamber and defining a flow aperture therethrough,
a first and second dynamic valve seal;
a fixed seal opposite the first dynamic seal;
a pressure plate having an axially extending key and a radially extending key, the radially extending key being received by a slot extending into an interior surface of the valve body;
a flow disk carried by the valve body and substantially disposed within the fluid flow passage, the flow disk having a keyway receiving the axially extending key of the pressure plate, the flow disk having an annular sealing rib;
wherein the engagement between the radially extending key of the pressure plate and the slot of the valve body and the engagement between the axially extending key of the pressure plate and the keyway of the flow disk prevents angular rotation of the flow disk relative to the valve body.

2. The ball valve of claim 1 wherein the slot is elongated in the axial direction of the flow disk a distance greater than the axial thickness of the radially extending key to permit axial movement of the flow disk relative to the valve body.

3. The ball valve of claim 2 wherein the slot has a width that is substantially the same as a width of the radially extending key.

4. The ball valve of claim 3 further comprising a biasing member biasing the flow disk axially towards the valve member, the biasing member directly acting on the flow disk.

5. The ball valve of claim 4 further comprising a valve seal axially interposed between the flow disk and the valve member, the valve seal including a seal member axially contacting an outer surface of the valve member, a valve body seal radially sealing the seal member to the valve body and a flow disk seal axially sealing the flow disk to the seal member, the biasing member axially biasing the flow disk into sealing engagement with the flow disk seal.

6. The ball valve of claim 1 wherein the flow disk is axially interposed between the valve member and the pressure plate.

7. The ball valve of claim 1 wherein the pressure plate has an opening therethrough, the opening aligned with a flow characterizing feature of the flow disk, wherein the flow disk and the pressure plate are in axial abutment.

8. The ball valve of claim 7 wherein the pressure plate has an annular pocket extending into an axial face of the pressure plate, and wherein the annular pocket receives at least a portion of a biasing element axially biasing the pressure plate toward the flow disk and into axial abutment with the flow disk.

9. The ball valve of claim 8 wherein the biasing element is a spring having a first end and a second end, wherein the first end of the spring is received by the annular pocket of the pressure plate, and the second end is in abutted contact with a fitting installed in one of the plurality of ports.

10. The ball valve of claim 9 further comprising a valve seal axially interposed between the flow disk and the valve member, the valve seal including a seal member axially contacting an outer surface of the valve member, a valve body seal radially sealing the seal member to the valve body and a flow disk seal axially sealing the flow disk to the seal member, the biasing member axially biasing the flow disk, via the pressure plate, into sealing engagement with the flow disk seal.

11. The ball valve of claim 1, wherein at least two of the plurality of ports are arranged along an first axis, and at least one of the plurality of ports is arranged along a second axis at a non-zero angle to the first axis;
the valve member selectively rotatable within the valve chamber to adjust flow along the fluid flow passage by adjusting the orientation of the flow aperture relative to the plurality of ports;
the first and the second dynamic seals being carried by the valve body, wherein the first dynamic seal is biased toward the valve member along the first axis, and the second dynamic seal is biased toward the valve member along the second axis; and
the fixed seal being arranged along the first axis and in opposed spaced relation to the first dynamic seal, wherein the fixed seal fixes the location of the valve member in a first direction along the first axis and a second direction along the second axis.

12. The ball valve of claim 11 wherein the fixed seal has an arcuate surface that sealingly engages an outer surface of valve member, wherein the arcuate surface and outer surface cooperatively center the ball valve within the valve chamber in the first and second directions.

13. The ball valve of claim 12 wherein the fixed seal has a first and a second end, the arcuate sealing surface located at the first end and an abutting surface located at the second end, and wherein the valve body includes an annular abutment flange extending transversely away from an interior surface of the valve body, the annular abutment flange in abutted contact with the abutting surface of the fixed seal such that only a single piece is positioned between the valve body and valve member to seal the valve member at that location.

14. A ball valve, comprising:
a valve body having a plurality of ports and a valve chamber therebetween, the plurality of ports and the valve member defining a fluid flow passage wherein at least two of the plurality of ports are arranged along a first axis, and at least one of the plurality of ports is arranged along a second at a non-zero angle relative to the first axis;
a valve member disposed within the valve chamber, the valve member selectively movable within the valve chamber;
a first and a second dynamic valve seal carried by the valve body and sealingly engaging the valve member, wherein the first dynamic seal is biased toward the valve member along the inline first, and the second dynamic seal is biased toward the valve member along the second axis, and wherein the first dynamic valve seal includes a compliant valve body seal and a compliant flow disk seal, the compliant valve body seal and compliant flow disk seal carried by a seal member of the first dynamic valve seal;
a fixed seal arranged along the first axis and in opposed spaced relation to the first dynamic seal, wherein the fixed seal operably centers the valve member in a first direction along the first axis and a second direction along the second axis;
a pressure plate carried by the valve body, the pressure plate extending between first and second axial faces, wherein an annular pocket extends into the first axial face, an axially extending key extends transversely away from the second axial face, and a radially extending key extends radially away from an outer periphery of the flow disk, wherein the radially extending key is received by a slot extending into an interior surface of the valve body, the slot extending a length that is greater than a thickness of the radially extending key and the slot extending a width that is substantially equal to a width of the radially extending key, and wherein the pressure plate has an opening generally at the center of the pressure plate; and
a flow disk carried by the valve body and substantially disposed within the fluid flow passage, the flow disk extending between a first axial face and a second axial face and including a flow characterizing feature, the flow characterizing feature aligned with the opening of the pressure plate, wherein a keyway extends into the first axial face and is adapted to receive the axially extending key of the pressure plate, and wherein an annular sealing rib extends transversely away from the second axial face, the annular sealing rib sealingly engaging the compliant flow disk seal of the valve seal, wherein engagements between the slot and radially extending key and axially extending key and keyway combine to prevent angular rotation of the flow disk relative to the valve body.

* * * * *